(12) United States Patent
White et al.

(10) Patent No.: US 9,112,343 B1
(45) Date of Patent: Aug. 18, 2015

(54) POWER FEEDER SHIELDING FOR ELECTROMAGNETIC PROTECTION

(75) Inventors: Jeffrey J. White, Shoreline, WA (US); Corneliu Michaels, Mukilteo, WA (US); John Kemp Erdelyan, Lake Steven, WA (US); Ourania Koukousoula, Kirkland, WA (US); Yousif Bitti, Everett, WA (US); Michael C. Dosch, Renton, WA (US)

(73) Assignee: The Boeing Company, Chicago, IL (US)

( * ) Notice: Subject to any disclaimer, the term of this patent is extended or adjusted under 35 U.S.C. 154(b) by 395 days.

(21) Appl. No.: 13/602,943

(22) Filed: Sep. 4, 2012

(51) Int. Cl.
*H01B 9/02* (2006.01)
*H05F 3/02* (2006.01)
*H02G 13/00* (2006.01)

(52) U.S. Cl.
CPC ............... *H02G 13/40* (2013.01); *H01B 9/028* (2013.01)

(58) Field of Classification Search
CPC .... H01R 43/20; H02G 13/40; B64D 2221/00; B64D 45/02; H01B 9/026; H01B 9/028; H01B 7/30; H01B 7/32
USPC ........... 174/102 R, 115; 361/218, 220; 307/3, 307/91
See application file for complete search history.

(56) References Cited

U.S. PATENT DOCUMENTS

| | | | | |
|---|---|---|---|---|
| 2,070,141 A | * | 2/1937 | Robinson et al. | 174/109 |
| 3,031,523 A | * | 4/1962 | Howard, Jr. | 174/102 R |
| 3,422,281 A | * | 1/1969 | Coston | 307/147 |
| 3,459,877 A | * | 8/1969 | Bullock et al. | 174/107 |
| 3,496,281 A | * | 2/1970 | McMahon | 174/29 |
| 3,571,613 A | * | 3/1971 | Plate et al. | 307/147 |
| 3,673,307 A | * | 6/1972 | Eager et al. | 174/25 R |
| 4,715,571 A | * | 12/1987 | Soltow et al. | 248/68.1 |
| 4,816,611 A | * | 3/1989 | Invernizzi | 174/2 |
| 5,131,064 A | * | 7/1992 | Arroyo et al. | 385/102 |
| 5,218,167 A | * | 6/1993 | Gasque, Jr. | 174/37 |
| 5,243,138 A | * | 9/1993 | Guthke et al. | 174/146 |
| 5,418,330 A | * | 5/1995 | Rook | 174/78 |
| 5,631,444 A | * | 5/1997 | Rook | 174/78 |
| 5,742,982 A | * | 4/1998 | Dodd et al. | 24/16 R |
| 5,817,982 A | * | 10/1998 | Arumugasaamy et al. | 174/120 R |
| 5,834,699 A | * | 11/1998 | Buck et al. | 174/113 R |
| 5,864,094 A | * | 1/1999 | Griffin | 174/105 R |
| 6,127,625 A | * | 10/2000 | Castano | 174/40 R |
| 6,191,354 B1 | * | 2/2001 | Castano et al. | 174/40 R |
| 7,060,905 B1 | * | 6/2006 | McMahon | 174/11 OR |
| D597,403 S | * | 8/2009 | Ho et al. | D8/396 |
| 8,020,259 B2 | * | 9/2011 | Ho et al. | 24/129 R |
| 8,020,811 B2 | * | 9/2011 | Nelson | 248/68.1 |
| 8,590,847 B2 | * | 11/2013 | Guthke et al. | 248/68.1 |
| 8,873,214 B2 | * | 10/2014 | Catchpole et al. | 361/220 |
| 2001/0011601 A1 | * | 8/2001 | Renaud | 174/102 R |

(Continued)

OTHER PUBLICATIONS

U.S. Appl. No. 13/848,842, Office Action issued Sep. 5, 2014.

(Continued)

*Primary Examiner* — Timothy Thompson
*Assistant Examiner* — Rhadames J Alonzo Miller
(74) *Attorney, Agent, or Firm* — Clifford Cousins

(57) ABSTRACT

A shielded power feeder system may include at least one unshielded power feeder conductor having first and second ends, a neutral conductor positioned adjacent the power feeder conductor, the power feeder conductor and neutral conductor forming a bundle, and the neutral conductor having a grounded conductive shield.

24 Claims, 5 Drawing Sheets

(56) References Cited

U.S. PATENT DOCUMENTS

| | | | | |
|---|---|---|---|---|
| 2004/0200634 | A1* | 10/2004 | Ysbrand | 174/102 R |
| 2005/0057320 | A1* | 3/2005 | Brandt et al. | 333/24 R |
| 2006/0158035 | A1* | 7/2006 | Brandt et al. | 307/3 |
| 2007/0120023 | A1* | 5/2007 | Martinez et al. | 248/75 |
| 2007/0272430 | A1* | 11/2007 | Tuffile et al. | 174/102 R |
| 2008/0007878 | A1* | 1/2008 | Gandolfi et al. | 361/42 |
| 2009/0261651 | A1* | 10/2009 | Godecke et al. | 307/3 |
| 2010/0046128 | A1* | 2/2010 | Wang et al. | 361/42 |
| 2010/0097023 | A1* | 4/2010 | Nakamura et al. | 318/400.41 |
| 2010/0307811 | A1* | 12/2010 | Griffin | 174/350 |
| 2012/0000690 | A1* | 1/2012 | Van Der Meer | 174/102 R |
| 2012/0043108 | A1* | 2/2012 | Blumer et al. | 174/107 |
| 2012/0075756 | A1* | 3/2012 | Yu et al. | 361/42 |
| 2013/0187012 | A1* | 7/2013 | Blakeley et al. | 248/68.1 |
| 2013/0258541 | A1* | 10/2013 | Knobloch et al. | 361/111 |

OTHER PUBLICATIONS

U.S. Appl. No. 14/136,918, Office Action issued Dec. 9, 2014.

* cited by examiner

POWER FEEDER SHIELDING FOR ELECTROMAGNETIC PROTECTION

BACKGROUND

The present invention relates to electrical conductors and, more particularly, to electrical conductors for transmitting electrical power that are shielded from electromagnetic effects.

Electrical systems aboard aircraft are susceptible to electromagnetic effects (EME). As used herein, EME includes electromagnetic interference (EMI), such as transient voltage and current spikes caused by lightning, as well as electromagnetic compatibility (EMC) issues. Such electrical systems often include long runs of conductors that convey electric current from a source, such as a battery, generator or circuit panel, to a load, such as a motor, a light or other electrical component. For example, a lightning strike may cause electric voltage or current to be induced in the conductors, where it travels to and may damage electrical components.

The effect of a lightning strike may be mitigated somewhat in an aircraft made of a conductive material such as aluminum. A lightning strike may be conducted along the skin of an aircraft made of aluminum and not induce significant electric current in the conductors of on-board electrical systems. However, with the introduction of aircraft made partly or entirely of composite materials, such as carbon fiber composites, the ability of the skin of an aircraft to conduct electricity and therefore act as a shield for internal electrical conductors from external EMI such as lightning strikes, is reduced or eliminated, which may require greater shielding of electrical conductors.

Typically, an electrical conductor, such as that found in a power feeder system, may provide three-phase power. The three-phase power may be created by a generator on board the aircraft and transmitted by cables to a bus or load, such as a three-phase motor. The feeder system in such an application may include three discrete, insulated cables wrapped around a neutral cable, forming a bundle. The bundle of four cables may be enclosed in a sheath of braided metallic material (commonly referred to as a shield) that is grounded at its ends. The braided metallic material may be covered by a sheath of insulating material, and may be separated from the bundle of conductors and neutral cable by a layer of insulated material.

The metallic sheath that covers the entire bundle of conductors and the neutral cable may add to the non-payload weight of the aircraft, which is undesirable. Moreover, by enveloping the entire cable bundle in a grounded, metallic sheath, which in turn may be covered by an insulative sheath, there is a risk of unacceptable heat build-up within the sheath. Accordingly, there is a need for a power feeder system that provides adequate protection from transient voltage spikes resulting from EME, such as lightning strikes to an aircraft, and which minimizes heat build-up and weight.

SUMMARY

The present disclosure is directed to a shielded power feeder system that minimizes the shielding necessary to effect protection of voltage and current spikes from EME, such as a lightning strike or other electromagnetic effect, which also minimizes heat build-up in the feeder system. In one aspect, the shielded power feeder system may include at least one unshielded power feeder conductor having first and second ends, a neutral conductor positioned adjacent the power feeder conductor, the power feeder conductor and neutral conductor forming a bundle, and the neutral conductor having a grounded conductive sheath or shield.

In another aspect, a shielded power feeder system may include a plurality of unshielded power feeder cable conductors, each of the cable conductors having first and second ends and together forming a bundle, a neutral conductor cable positioned at a center of the bundle, the cable conductors being spaced evenly about the neutral conductor cable, and the neutral conductor cable having an insulation layer extending thereover, and a grounded conductive shield extending over the insulation layer. In yet another embodiment, a method of forming a shielded power system may include providing at least one unshielded power feeder conductor having first and second ends, providing a neutral conductor positioned adjacent the power feeder conductor, the power feeder conductor and neutral conductor forming a bundle, and providing the neutral conductor with a grounded conductive shield.

Other aspects and advantages of the present disclosure will be apparent from the following description, the accompanying drawings and the appended claims.

DETAILED DESCRIPTION

Figure 1:
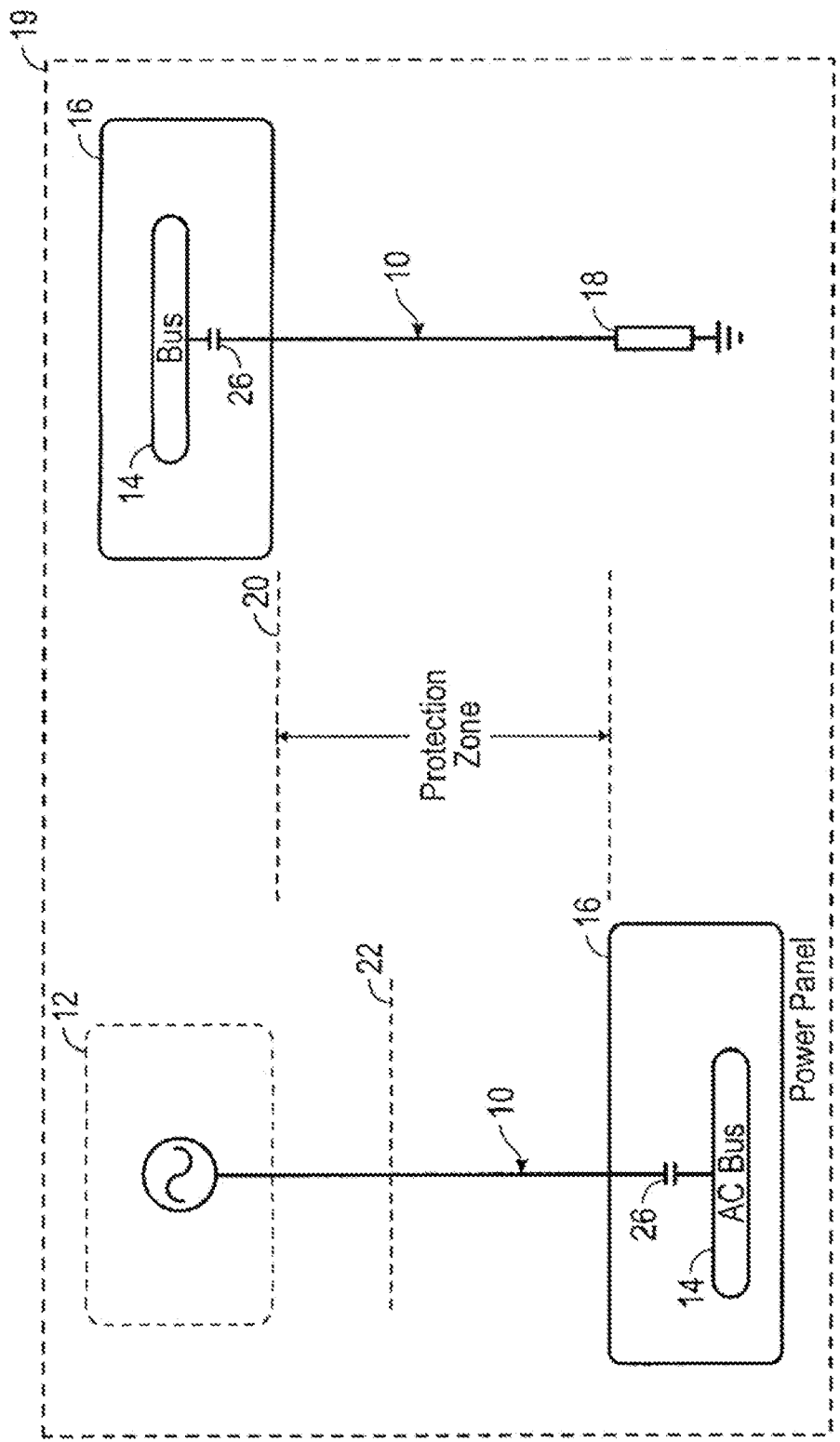
FIG. 1 is a schematic showing the disclosed shielded power feeder system used to convey power from a generator to a power panel, and from a power panel to a load.

As shown in FIG. 1, the shielded power feeder system, generally designated 10, may be employed to extend between a generator 12 and an electrical bus 14, which may consist of one or more electrical components or loads, as shown in the left-hand portion of FIG. 1. In an embodiment, the shielded power feeder system 10 also may be employed to extend between a power panel 16 and a load 18, as shown in the right-hand portion of FIG. 1. In an embodiment, the electrical bus 14 may be the source, while the load 18 may be a variable frequency starter generator (such as the generator 12). In other embodiments, the load 14 may be a single-phase or polyphase motor, or other electrical component. Either or both of the circuits shown in FIG. 1 may be located within a vehicle 19, such as an aircraft. The shielded power feeder system 10 may extend through a protection zone 20 that may include a production break 22 (e.g., where an aircraft wing is attached to a fuselage). The power feeder system 10 may be connected to the bus 14 of power panel 16. The power panel 16 also may include a circuit breaker 26.

Figure 2:
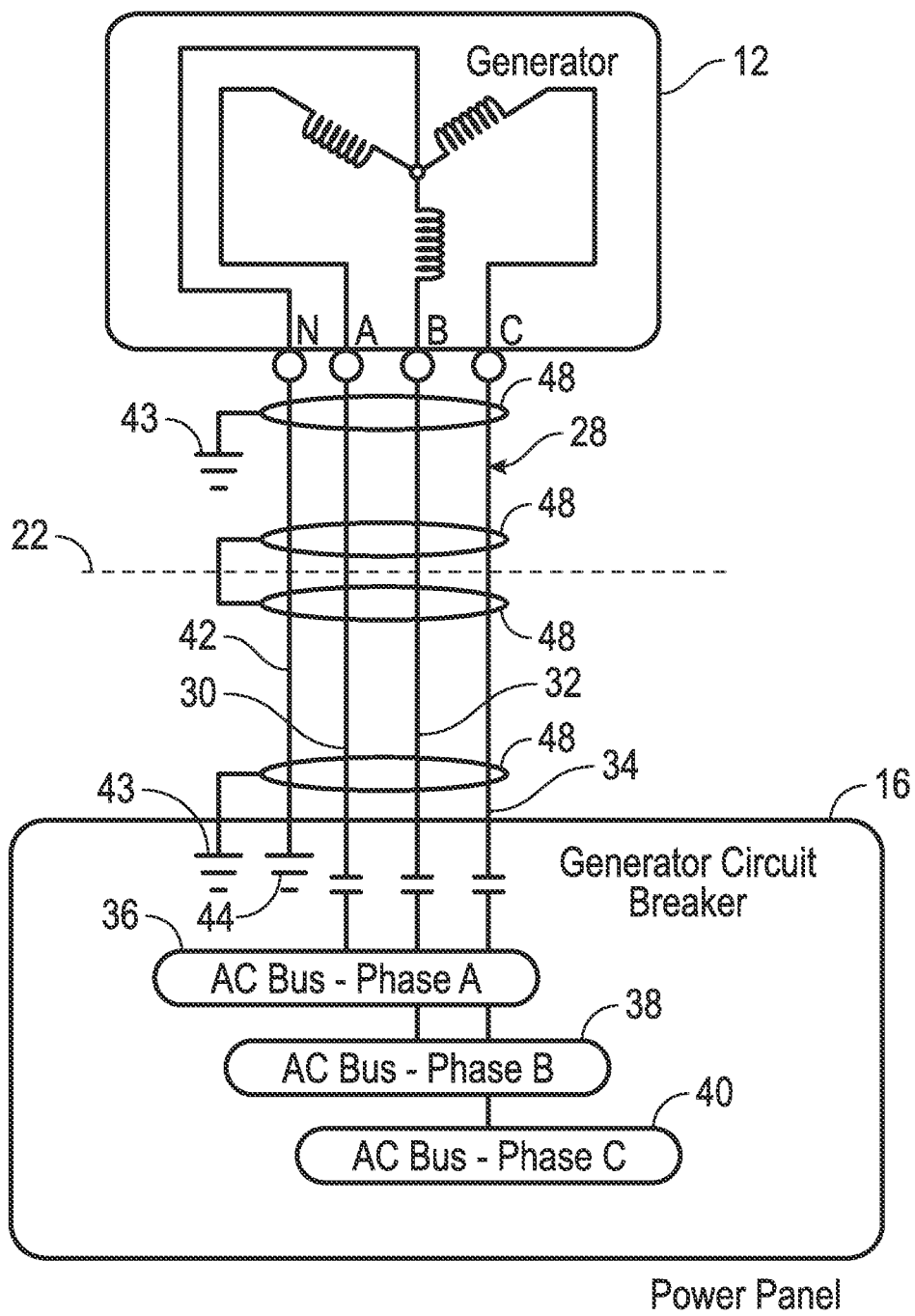
FIG. 2 is a schematic showing a prior art shielded power feeder system.
Figure 4A:
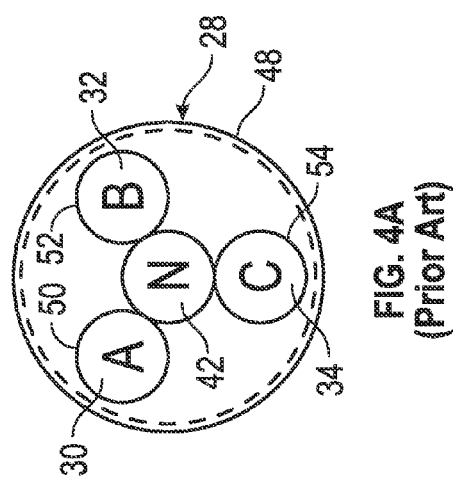
FIGS. 4A and 4B are schematics showing cross-sections of prior art power feeder cables.

As shown in FIG. 2, in a prior art shielded power feeder system, generally designated 28, the system may include power feeder conductors 30, 32, and 34. Conductors 30, 32, 34 are connected, respectively, to alternating current buses 36, 38, 40 within a power panel 16. Cables 30, 32, 34 may be connected to contacts A, B and C of a three-phase generator 12. Neutral conductor 42 may be connected to the neutral contact N and grounded at 44. As shown in FIG. 4A, the conductors 30, 32, 34 may be spaced about the neutral 42. The conductors 30, 32, 34, and neutral 42 together form a bundle that is shielded by a sheath 48 that encloses the entire bundle; that is, the sheath 48 encloses conductors 30, 32, 34, and neutral 42. Further, conductors 30, 32, 34 themselves may have insulative coverings or sheaths 54. The sheath 48 may include a first layer of an insulative material such as plastic or rubber, a second layer of a conductive material, grounded at its ends 43, such as a woven sheath of metal such as copper or nickel-plated copper, and an outer layer of an insulative material, such as a plastic or rubber.

Figure 4B:
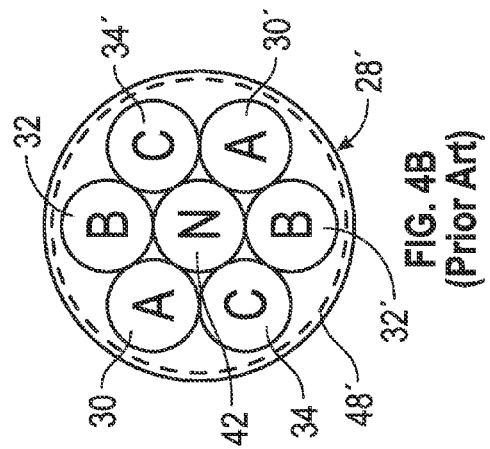

As shown in FIG. 4B, in another prior art power feeder system 28', a neutral cable 42 is surrounded by 6 conductors 30, 30', 32, 32', 34, 34'. As with the embodiment of FIG. 4A, the embodiment of FIG. 4B provides a neutral cable 42 that is surrounded by conductors 30-34', typically wrapped around the neutral in a spiral pattern. The entire arrangement forms a bundle that is enclosed within a sheath 48' having the same layered construction as the sheath 48 of FIG. 4A; namely, an inner layer of insulated material, a layer of conductive material surrounding it, and an outer layer of insulated material.

A disadvantage with this construction is that the shielded power feeder system 28, 28' requires a great deal of metal to form the sheath 48, 48', which adds non-payload weight to the aircraft 18 (FIG. 1). Further, by enclosing the entire bundle in sheath 48, 48', the enclosure may allow undesirable heat build-up in the power feeder system within the sheath 48, 48'.

Figure 3:
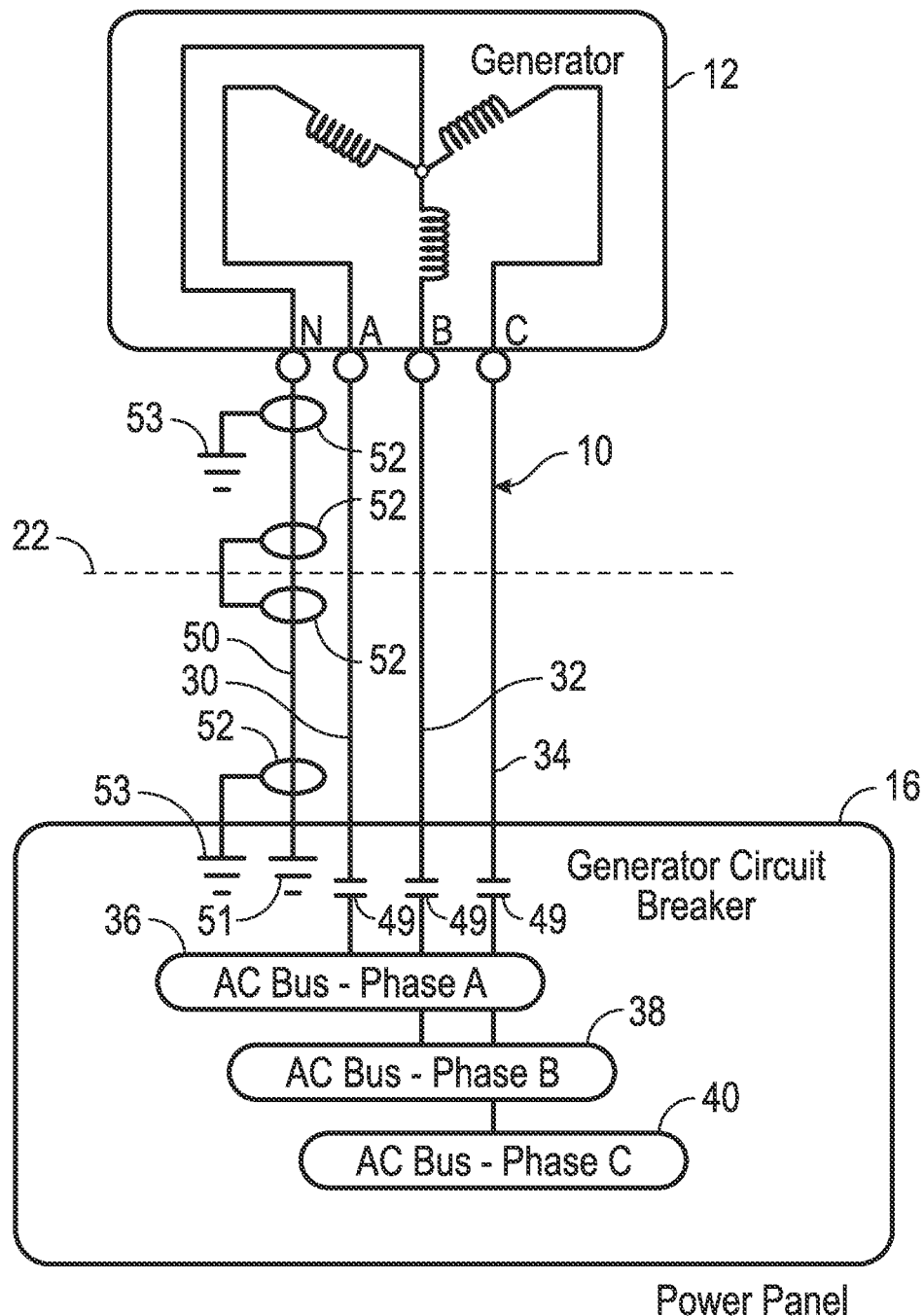
FIG. 3 is a schematic showing an embodiment of the disclosed shielded power feeder system.
Figure 6A:
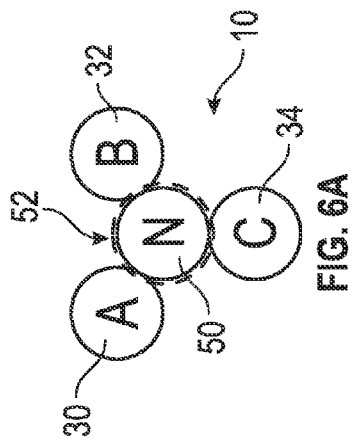
FIGS. 6A and 6B are cross-sections of embodiments of the disclosed shielded power feeder system.

As shown in FIGS. 3 and 6A, the disclosed shielded power feeder system 10 may be used in a three-phase power feeder system. In other embodiments, the power feeder system may be used in other polyphase systems (not shown) having two phases, or more than three phases, or may be used in a single-phase system (not shown). In the system 10 shown in FIG. 3, power feeder conductors 30, 32, 34 may be connected to alternating current buses 36, 38, 40 of the power panel 16, and extend to contacts A, B, and C (corresponding to the three phases of the generator) of the load, which may be a generator 12, such as a variable frequency starter generator. The conductors 30, 32, 34 each may be connected to a circuit breaker 49 of the power panel 16.

In an embodiment, the power feeder conductors 30, 32, 34 may be cables and may be unshielded; that is, they do not include coverings that include a conductive layer or shield from EME. As used herein, the term "unshielded" means, with respect to a conductor, that the conductor is not covered with a conductive layer separated by an insulating layer. An unshielded conductor may be covered by a layer or layers of insulating material and still be unshielded if it does not also have a layer of conductive material covering it.

Figure 5:
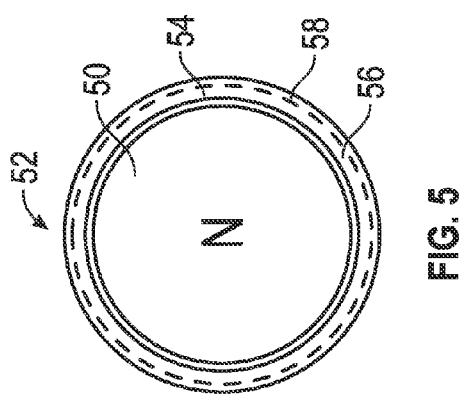
FIG. 5 is a cross-section of a neutral conductor of the disclosed shielded power feeder system.

The system 10 also may include a neutral conductor 50 that is connected to the power panel 12 and contact N of the generator 12, and is grounded at 51. As shown in FIGS. 3 and 5, the neutral conductor 50 is enclosed in a conductive shield, generally designated 52, that is grounded at its ends at 53. In other embodiments, the conductive shield 52 may be grounded at one or more additional locations between its ends. In an embodiment, the conductive shield 52 may be layered directly on the outer surface of the neutral conductor 50. In various embodiments, the conductive shield 52 may extend the entire length of the neutral conductor 50, may extend along only length in the protection zone 20 (FIG. 1), or a portion or portions of the neutral conductor.

As shown in FIG. 5, the conductive shield 52 that encloses neutral conductor 50 may include an insulation layer 54 that is immediately adjacent the neutral conductor 50, and in an embodiment is bonded directly to the neutral conductor. The insulation layer 54 may be composed of plastic or rubber. A conductive layer 56 is immediately adjacent and encloses the insulation layer 54. Conductive layer 56 may be made of a metallic material and may be braided. Metallic materials may include copper and nickel-plated copper. In other embodiments, the conductive layer 56 may be made of a conductive foil or a combination of braided metallic material and conductive foil material. In an embodiment, the conductive shield 52 may include an outer layer or jacket 58 of an insulative material, such as plastic or rubber covering the conductive layer 56.

As shown in FIG. 6A, the power feeder conductors 30, 32, 34 and neutral conductor 50 of the power feeder system 10 may be arranged in a bundle in which the neutral conductor may be positioned at the center of the bundle, surrounded by the unshielded power feeder conductors. As is apparent from FIG. 6A, the only shielding from EME present in the bundle may be the grounded conductive shield 52 that encloses the neutral conductor 50. In an embodiment, the conductors 30, 32, 34 may be spaced evenly about the neutral conductor 50 and, in an embodiment, the conductors 30, 32, 34 extend in a spiral configuration (commonly referred to as twisted) as they extend lengthwise between the power panel 12 and load 14 or generator 16 (FIG. 1).

Figure 6B:
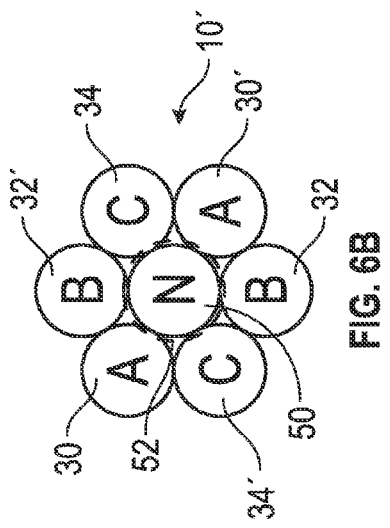

As shown in FIG. 6B, a power feeder system 10' may include a bundle composed of six unshielded power feeder conductors 30, 32, 34, 30', 32', 34', spaced evenly about the shielded neutral conductor 50. Again, the shielding 52 may be the only shielding that is required or present in the bundle of feeder system 10'.

Figure 7A:
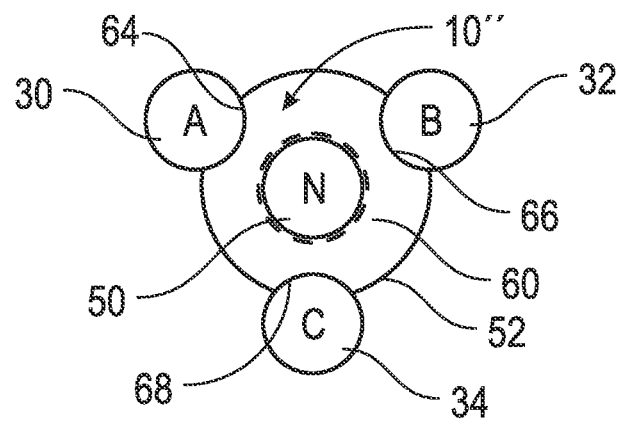
FIGS. 7A and 7B are embodiments of the disclosed shielded power feeder system, shown with spacers between the conductor cables and the neutral cable.
Figure 7B:
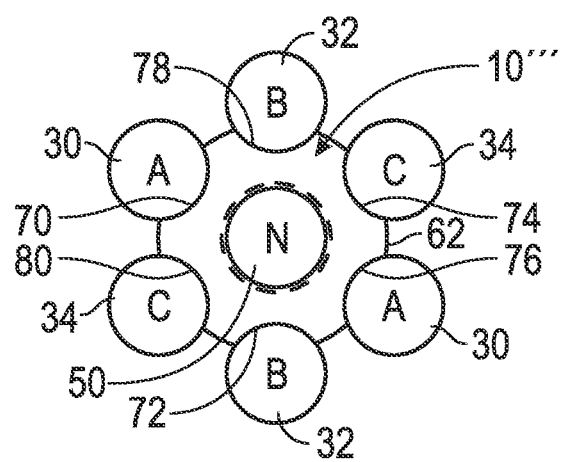

As shown in FIGS. 7A and 7B, embodiments 10" and 10'" of the disclosed shielded power feeder system may include spacers 60, 62. The spacer 60 of FIG. 7A may surround neutral conductor 50 and grounded conductive shield 52. The spacer 60 may include recesses 64, 66, 68 shaped to receive unshielded conductors 30, 32, 34.

Similarly, in FIG. 7B, spacer 62 may include recesses 70, 72, 74, 76, 78, 80 shaped to receive unshielded conductors 30, 32, 34, 30', 32', 34', respectively. Spacers 60, 62 may maintain the unshielded conductors 30, 32, 34, 30', 32', 34' in an evenly spaced relationship as shown in FIGS. 7A and 7B. As indicated in FIG. 1, a plurality of spacers 60, 62 may be spaced along the power feeder system 10 in the protection zone 20. Spacers 60, 62 may be oriented relative to each other to maintain a helical path of the conductors 30, 32, 34, 30', 32', 34' around neutral cable 50 as they extend from the power panel 12 to the load 14 or generator 16.

As best understood, in the event of EME, such as a lightning strike or other electromagnetic pulse, impacting the vehicle 18 (FIG. 1), the current from the EMI would be carried by the conductive layer 56 (FIG. 5) of the neutral conductor 50 to ground 44. The flow of current from the EMI source through the conductive layer 56 may establish a magnetic field in the center of the bundle shown in FIGS. 6A, 6B, 7A, and 7B, which in turn opposes and cancels EMI-induced currents on the feeder conductors 30, 32, 34, 30', 32', 34'. An advantage of the embodiments 10, 10' 10", and 10'", is that the design provides protection of power feeders and other conductors aboard a vehicle such as an aircraft 18 from damage from lightning-induced voltage and current, as well as other EME, by employing a small shield 52 that surrounds only the neutral conductor 42. The neutral shield 52 conducts the lightning current or other EME current safely to ground, and establishes a magnetic field in the center of the bundle that opposes any induced voltage or currents on the other feeder conductors. Because the shield 52 surrounds only the neutral conductor 50, as opposed to surrounding the entire bundle of conductors, as shown in the prior art depicted in FIGS. 2, 4A and 4B, the system 10, 10', 10" and 10''' design may provide a significant reduction in the overall weight of the power feeder system.

While the forms of apparatus and methods disclosed herein constitute preferred embodiments on the invention, it is to be understood that other forms may be employed without departing from the scope of the invention.

What is claimed is:

1. A shielded power feeder system comprising:
   at least one unshielded power feeder conductor;
   a neutral conductor positioned adjacent the at least one power feeder conductor, the at least one power feeder conductor and the neutral conductor forming a bundle; and
   a grounded conductive shield at least partially covering only the neutral conductor.

2. The shielded power feeder system of claim 1, wherein the neutral conductor is positioned in a center of the bundle.

3. The shielded power feeder system of claim 1, wherein the grounded conductive shield includes a first insulation layer covering the neutral conductor; and a conductive layer having first and second ends and being grounded at least at the first and second ends, the conductive layer covering the first insulation layer.

4. The shielded power feeder system of claim 1, wherein the at least one power feeder conductor includes a polyphase bundle.

5. The shielded power feeder system of claim 4, wherein the polyphase bundle includes at least three unshielded power feeder conductors twisted around an exterior of the grounded conductive shield.

6. The shielded power feeder system of claim 5, wherein the three unshielded power feeder conductors are evenly spaced about the grounded conductive shield.

7. The shielded power feeder system of claim 4, wherein the polyphase bundle includes two or more unshielded parallel conductors for each phase of the polyphase bundle.

8. The shielded power feeder system of claim 1, wherein the neutral conductor is positioned relative to the unshielded power feeder conductor such that an electric current flowing through the grounded conductive shield from EMI causes a magnetic field in a center of the bundle that opposes EME-induced voltages and currents in the at least one unshielded power feeder conductor.

9. The shielded power feeder system of claim 1, further comprising a spacer connected to the at least one power feeder conductor and the grounded conductive shield, the spacer being shaped to hold the neutral conductor at a center of the bundle.

10. The shielded power feeder system of claim 1 wherein the at least one unshielded power feeder conductor, the neutral conductor and the grounded conductive shield each includes a production break, and each of the at least one power feeder conductor, the neutral conductor and the grounded conductive shield are electrically joined to traverse the production break.

11. The shielded power feeder system of claim 1, wherein the at least one power feeder conductor is connected at a first end thereof to a source of electrical power and at a second end thereof to an electrical load.

12. The shielded power feeder system of claim 11, wherein the source of electrical power is one of a three-phase generator and a power panel.

13. The shielded power feeder system of claim 11, wherein the source of electrical power is installed on an aircraft.

14. A shielded power feeder system comprising:
   a plurality of unshielded power feeder cable conductors, the unshielded power feeder cable conductors together forming a bundle;
   a neutral conductor cable positioned at a center of the bundle, the unshielded power feeder cable conductors being spaced evenly about the neutral conductor cable; and
   the neutral conductor cable having an insulation layer extending thereover, and a grounded conductive shield extending over the insulation layer.

15. A method of forming a shielded power feeder system, the method comprising:
   positioning a neutral conductor adjacent at least one unshielded power feeder conductor, the at least one unshielded power feeder conductor and the neutral conductor together forming a bundle; and
   covering only the neutral conductor with a grounded conductive shield.

16. The method of claim 15, further comprising locating the neutral conductor at a center of the bundle.

17. The method of claim 15, further comprising providing the grounded conductive shield with a first insulation layer covering the neutral conductor and providing a metallic shield over the insulation layer.

18. The method of claim 15, wherein providing at least one unshielded power feeder conductor includes providing at least three unshielded power feeder conductors; and wrapping the unshielded power feeder conductors about the grounded conductive shield of the neutral conductor in a spiral to form a bundle such that the unshielded power feeder conductors are evenly spaced about the grounded conductive shield.

19. A shielded power feeder system comprising:
   at least one unshielded power feeder conductor;
   a neutral conductor positioned adjacent the at least one power feeder conductor, the at least one power feeder conductor and the neutral conductor forming a bundle;
   a grounded conductive shield at least partially covering the neutral conductor; and
   wherein the grounded conductive shield includes a first insulation layer covering the neutral conductor; and a conductive layer having first and second ends and being grounded at least at the first and second ends, the conductive layer covering the first insulation layer.

20. The shielded power feeder system of claim 19, wherein the conductive layer is made of one of a braided metallic material, a conductive foil material and a combination of braided metallic material and conductive foil material.

21. The shielded power feeder system of claim 19, wherein the grounded conductive shield includes a jacket made of an insulative material covering the conductive layer.

22. A shielded power feeder system comprising:
   at least one unshielded power feeder conductor, the at least one power feeder conductor including a polyphase bundle;
   a neutral conductor positioned adjacent the at least one power feeder conductor, the at least one power feeder conductor and the neutral conductor forming a bundle;
   a grounded conductive shield at least partially covering the neutral conductor; and
   the polyphase bundle including at least three unshielded power feeder conductors twisted around an exterior of the grounded conductive shield.

23. A shielded power feeder system comprising:
at least one unshielded power feeder conductor, the at least one power feeder conductor including a polyphase bundle, wherein the polyphase bundle includes two or more unshielded parallel conductors for each phase of the polyphase bundle;
a neutral conductor positioned adjacent the at least one power feeder conductor, the at least one power feeder conductor and the neutral conductor forming a bundle; and
a grounded conductive shield at least partially covering the neutral conductor.

24. A shielded power feeder system comprising:
at least one unshielded power feeder conductor;
a neutral conductor positioned adjacent the at least one power feeder conductor, the at least one power feeder conductor and the neutral conductor forming a bundle;
a grounded conductive shield at least partially covering the neutral conductor wherein the at least one unshielded power feeder conductor; and
wherein the neutral conductor and the grounded conductive shield each includes a production break, and each of the at least one power feeder conductor, the neutral conductor and the grounded conductive shield are electrically joined to traverse the production break.

* * * * *